Sheet 1,
2 Sheets.

A. M. Allen.
Car Brake.

No. 3,790. Reissued Jan. 11, 1870.

Witnesses.

C. Wahlers

E. F. Kastenhuber

Inventor.

A. M. Allen per Pontwood & Hay
Attys

Sheet 2,
2 Sheets.

A. M. Allen.
Car Brake.

No. 3,790. Reissued Jan. 11, 1870.

Witnesses.
C. Wahlers
E. F. Kastenhuber

Inventor.
A. M. Allen
per
Van Santvoord & Hoff
Attys

United States Patent Office.

ARTHUR M. ALLEN, OF NEW YORK, N. Y.

*Letters Patent No.* 91,404, *dated June* 15, 1869; *reissue No.* 3,790, *dated January* 11, 1870.

IMPROVEMENT IN RAILWAY-CAR BRAKES.

The Schedule referred to in these Letters Patent and making part of the same

*To all whom it may concern:*

Be it known that I, ARTHUR M. ALLEN, of the city, county, and State of New York, have invented a new and useful Improvement in Car-Brakes; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
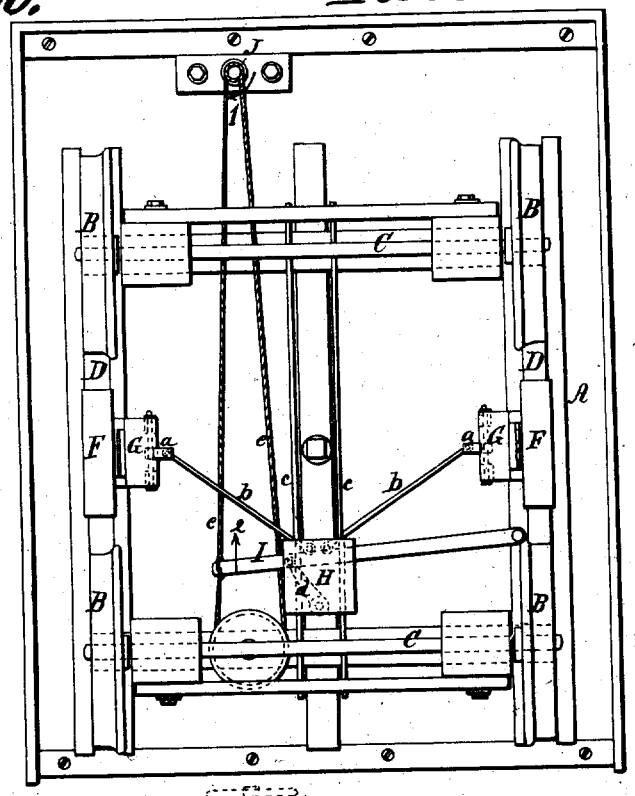
Figure 1 represents an inverted plan of this invention.
Figure 2:
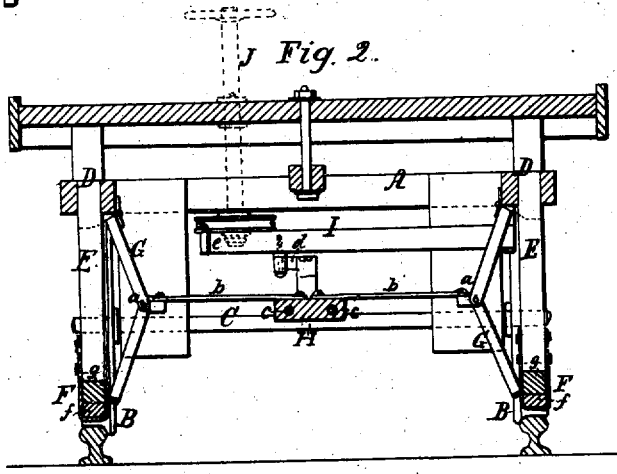
Figure 2 is a transverse section of the same.

This invention relates to certain improvements in that class of car-brakes in which the brake-shoes are brought to bear upon the rails, instead of on the peripheries of the wheels.

My improvement consists in the peculiar construction of the mechanism for operating the rising and falling brake-shoes, and also in the peculiar construction of said brake-shoes, as will be hereinafter more fully explained.

In the drawing—

The letter A designates the frame of a car-truck, which forms the bearings for the axles C of two pairs of wheels B, and which connects with the platform of the car in the usual manner.

To the side-timbers of the frame A are secured the hangers D, which form the guides for slides E, to the bottom ends of which are secured the brake-shoes F, so that by moving the slides E down in their guides, the shoes are brought to bear on the tops of the rails on which the truck stands, and by raising the slides, the shoes are caused to clear the rails.

The motion of the slides E is effected by means of toggle-levers G, which are hinged at one end to the truck-frame, and at the opposite end to the shoes, while their fulcra, *a*, connect, by arms *b*, with the windlass J.

Figure 3:
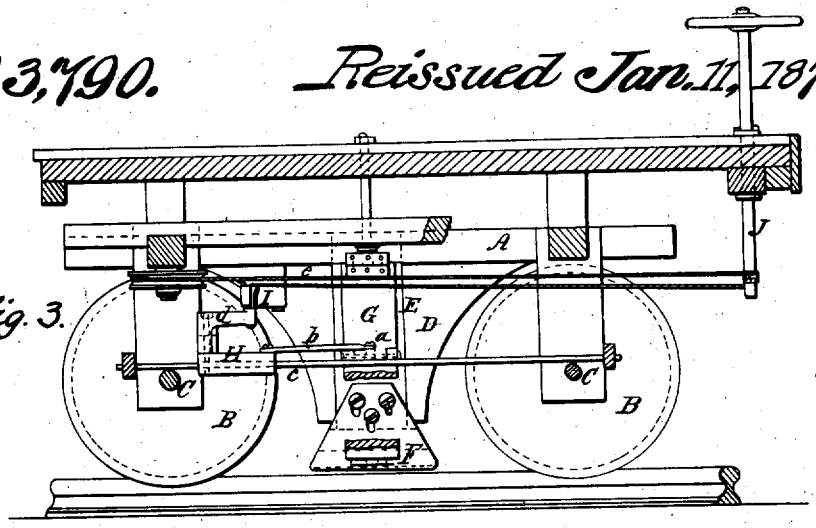
Figure 3 is a longitudinal section thereof.

The connection between the arms *b*, and the windlass, in the example shown in the drawing, is effected by means of a cross-head, H, that is fitted on guide-rods *c*, (see figs. 1 and 3,) and connects, by a link, *d*, with a lever, I, which is pivoted at one end to one of the side-timbers of the truck-frame, while its opposite end connects, by a rope or chain, *e*, with the windlass.

If the windlass is turned in the direction of arrow 1, marked near it in fig. 1, the lever I swings in the direction of arrow 2, and the toggle-levers G are straightened, so that the brake-shoes F are caused to bear down upon the rails with a slow but powerful motion, and the motion of the truck is quickly and effectually checked.

By turning the windlass in the opposite direction, or by bell-cranks and weights acting on the lever I, or on the arms *b*, the brake-shoes are lifted up again, and the truck is allowed to move along without obstruction.

If desirable, the cross-head H and the lever I can be dispensed with, and the windlass can be connected directly to the arms *b*, and it can be readily seen that the arms *b* also act as toggle-levers, so that a comparatively small power applied to the windlass will depress the brake-shoes with great force upon the rails.

I construct the brake-shoes in such a manner that their faces or bearing-surfaces are elastic or yielding, so as to enable them to yield to unevenness of the track, and to obviate shocks or jars.

In the present example of this portion of my invention, the brake-shoes are constructed of blocks *f*, of wood or other suitable material, backed up by elastic cushions *g*, of India rubber or other suitable material, and said blocks and cushions are retained by slotted face-plates *h*, through whose slots the bolts pass which connect the shoes to the slides E, so that the working-faces of the shoes are permitted to adapt themselves to any unevenness occurring in the track, and sudden jars or shocks are avoided.

The corners of the shoes are rounded, so that the same will not interfere with the ends of the rails, or with crossings.

It will be readily understood that by this arrangement the brake-shoes can be brought to bear upon the rails with the required force, and that this object can be accomplished with comparatively little power applied to the windlass.

Figure 4:
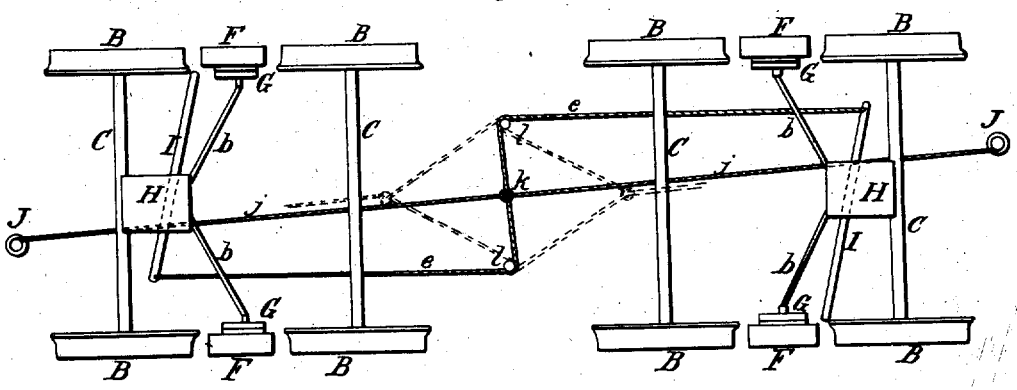
Figure 4 is a diagram illustrating the arrangement of my brake when it is to be operated from opposite ends of a car.

In fig. 4, I have illustrated the arrangement of my brake, whereby the brake-shoes at both ends of a car can be operated by turning the windlass at either one or the other end of the car.

In this case the windlasses J are connected, by ropes *j*, with a ring, *k*, which connects, by ropes *e*, with the levers I.

The ropes *e* run over pulleys *l*, secured to the truck-frame, and by turning either of the windlasses, both ropes *e* are strained simultaneously, and the shoes at the ends of the car are operated. On releasing the windlass, the shoes are raised by bell-cranks and weights, or in other suitable manner.

In operating the modification shown in fig. 4, it is obvious that there must be extra slack of the ropes *j j*, to allow of the independent operation of the windlasses. The dotted outline in that figure shows the positions of the ring in either case.

My brake is applicable to horse or street-cars, as well as to large cars, and can readily be adapted to cars of any construction.

I do not claim, broadly, the use of brake-shoes to bear down upon the rails of a railroad-track; but

What I claim as new, and desire to secure by Letters Patent, is—

1. The rising and falling shoes F, in combination with the toggles G, bars *b b*, and slide H, the latter moving in between the toggles, and thus closing and opening them, substantially as described.

2. The toggle-levers G, arms *b*, cross-head H, and lever I, in combination with the windlass J and rising and falling brake-shoes F, constructed and operated substantially as shown and described.

3. The elastic cushions *g*, in combination with the blocks *f*, of rising and falling brake-shoes F, substantially as set forth.

ARTHUR M. ALLEN.

Witnesses:
W. HAUFF,
E. F. KASTENHUBER.